(12) United States Patent
Metzger et al.

(10) Patent No.: US 7,001,579 B2
(45) Date of Patent: Feb. 21, 2006

(54) METHOD FOR PRODUCING HIGHLY PURIFIED, GRANULAR SILICIUM

(75) Inventors: Karl-Ludwig Metzger, Bergisch Gladbach (DE); Leslaw Mleczko, Bochum (DE); Sigurd Buchholz, Köln (DE); Philipp Schlichthärle, Odenthal (DE)

(73) Assignee: Solarworld Aktiengesellschaft, Bonn (DE)

( * ) Notice: Subject to any disclaimer, the term of this patent is extended or adjusted under 35 U.S.C. 154(b) by 222 days.

(21) Appl. No.: 10/451,577

(22) PCT Filed: Nov. 21, 2001

(86) PCT No.: PCT/EP01/13497

§ 371 (c)(1),
(2), (4) Date: Jun. 20, 2003

(87) PCT Pub. No.: WO02/49961

PCT Pub. Date: Jun. 27, 2002

(65) Prior Publication Data

US 2004/0052715 A1    Mar. 18, 2004

(30) Foreign Application Priority Data

Dec. 21, 2000   (DE) ................ 100 63 862

(51) Int. Cl.
*C01B 33/02* (2006.01)

(52) U.S. Cl. ............... 423/349; 423/348; 423/350

(58) Field of Classification Search ........... 423/324, 423/348, 349, 350
See application file for complete search history.

(56) References Cited

U.S. PATENT DOCUMENTS

| 3,293,171 A | | 12/1966 | Metrailer |
| 4,225,531 A | * | 9/1980 | Jones et al. ............. 518/719 |
| 4,818,495 A | * | 4/1989 | Iya .......................... 422/145 |
| 4,883,687 A | | 11/1989 | Gautreaux et al. |

FOREIGN PATENT DOCUMENTS

| DE | 32 22 153 A1 | | 12/1983 |
| DE | 3222153 A | * | 12/1983 |
| FR | 1438252 | | 5/1966 |

OTHER PUBLICATIONS

Translation of abstract only of DE 3222153 (single sheet), obtained through WEST.*

Kyu Kyu Win et al., Apr. 1994, "Pressure Fluctuations in a Multi-Solid Fluidized Bed", Journal of Chemical Engineering of Japan, Document is in English.

Gbordzoe, E. A. M. et al., Feb. 1988, "Gas Solid Contacting in a Two-Dimensional Fluidized Bed Containing Mobile Internals: Non-Reactive Tracer Studies", Canadian Journal of Chemical Engineering, Document is in English.

* cited by examiner

*Primary Examiner*—Colleen P. Cooke
(74) *Attorney, Agent, or Firm*—McGlew and Tuttle, P.C.

(57) ABSTRACT

The invention relates to a method for producing granular silicon by thermal decomposition of a gas containing silicon in a fluidized bed, said decomposition occurring in the presence of free-flowing mobile elements. Preferably, said free-flowing mobile elements become devoid of silicon in a separate procedural step, said silicon being deposited during decomposition of gas containing silicon, by reacting with hydrogen halides, halogens, alkyl halogenides, aryl halogenides or combinations of halogen and/or hydrogen halide and/or oxidized mineral acids and/or by thermal treatment of said elements.

21 Claims, No Drawings

METHOD FOR PRODUCING HIGHLY PURIFIED, GRANULAR SILICIUM

FIELD OF THE INVENTION

The present invention relates to a method for producing highly purified granular silicon by decomposition of a of silicic gas and the use of elemental silicon produced in this way in the photovoltaic area and in semi-conductor technology.

BACKGROUND OF THE INVENTION

Silicic gases as referred to herein are silicon compounds or mixtures of silicon compounds which under the conditions according to the invention can be decomposed in the gaseous phase depositing silicon. Silicon-free gases in the meaning of this invention are gases which do not contain any silicon compounds.

For the production of elemental silicon with a purity allowing its being used in the photovoltaic area and/or in semi-conductor technology, methods of thermal decomposition of volatile silicon compounds are known. Such thermal decomposition can be carried out, for example, in fluidized-bed reactors in that small silicon particles are provided which are then fluidized by an appropriate silicic gas or gas mixture flowing into the reactor, whereby the gases in the gas mixture can be silicic, but also silicon-free gases. Ideally, the thermal decomposition of such volatile silicon compounds shall occur exclusively on the surface of the small silicon particles are provided. The said small silicon particles provided, hereinafter referred to as nucleus particles, form a large area for the separation of silicon within the reactor. Particles that have grown to a sufficient size are removed from the reactor and new nucleus particles are introduced.

In addition to the separation of silicon on the particles during the decomposition of the gas containing silicon also silicon dust is produced which is difficult to handle and can be easily contaminated due to its large surface. Further the produced silicon dust contains significant amounts of hydrogen obstructing the subsequent melting on process. For this reason the formation of dust is undesired. Silicon dust in this context refers to silicon particles with a diameter of particles of up to approx. 25 $\mu$m.

It is known that in the case of decomposition of gas containing silicon in fluidized-bed reactors a major part of the dust is formed in a homogeneous reaction. This reaction occurs predominantly in the so-called bubble phase. The silicon formed in such phase by decomposition of gases containing silicon does not result in an expansion of provided nucleus particles by separation on said nucleus particles (Chemical Vapour Deposition CVD), but forms dust that is carried out from the reactor.

U.S. Pat. No. 4,818,495 A discloses a method for the production of silicon particles by thermal decomposition of a gas containing silicon in a fluidized bed. This is where silicon nucleus particles are added, on which deposits the silicon that has formed by decomposition.

On principle, so-called bubble breakers are suitable for the reduction of gas bubbles in a fluidized bed thus reducing the bubble phase. Different apparatuses with bubble-breaking function are known, e.g. vertical and horizontal gas distribution plates, geometrical constructions, such as tube combinations and three-dimensional grids and packings (tower packing, wires etc.). Such apparatuses have the disadvantage in fluidized beds and particularly under the aggressive reaction conditions prevailing at thermal decomposition of a gas containing silicon that the intensive radial and axial mixing can be diminished and that a strong erosion of the built-in elements must be expected. Such serious mechanical strain limits the number of materials suitable for the said built-in elements. Apart from this it must be ensured, particularly with regard to the high purity required for the desired use of the produced silicon in the semi-conductor or photovoltaic area, that the bubble breakers do not carry any contamination into the silicon. A silicon separation on the bubble breaker elements leads to internal overgrowing of the reactor. The construction and the scale-up of such bubble breakers are difficult.

SUMMARY AND OBJECTS OF THE INVENTION

The object of the present invention was to provide a reaction method for producing high-purity silicon suitable for use in the photovoltaic area and in electronics that enables a minimum formation of dust by minimizing the homogeneous reaction.

Subject-matter of the invention is a method for producing granular silicon by thermal decomposition of a gas containing silicon in a fluidized bed, said decomposition occurring in the presence of free-flowing mobile elements.

The use of free-flowing mobile elements as bubble breakers in a fluidized bed is known in principle (E. A. M. Gbordzoe, H. Littman, M. A. Bergougnou, *Canadian Journal of Chemical Engineering*, 66, 1998, 158-162). Such elements are known until now, however, only for use in heterogeneous catalysed gaseous phase reactions. The said mobile elements increase the transport of matter, but flow with the particles in the fluidized bed and are therefore not exposed to erosion as strongly as fixed built-ins.

DE 32 22 253 A1 describes the production of active carbon within the scope of a gas/solid reaction in a fluidized bed. Mobile elements are hollow balls that serve as bubble breakers.

When such free-flowing mobile elements are used in a method for producing granular silicon, silicon separates on such elements changing size and density of the free-flowing mobile elements during reaction. Too big elements with a too high density sink to the ground by segregation and have no more effect on the bubble size. Furthermore it was feared that the produced silicon would be contaminated due to impurities diffusing out of the elements.

Surprisingly, free-flowing mobile elements are suitable nevertheless for use in the method according to the invention and lead to a clear reduction of the amount of dust formed, without any negative impact such as contamination of the product or reduction of the conversion.

In order to ensure the efficiency of said free-flowing mobile elements also during longer reaction periods, it is preferred to remove silicon in a separate procedural step, said silicon being deposited on such free-flowing mobile elements during decomposition of gas containing silicon, by reacting such silicon with hydrogen halides, halogens, alkyl halogenides, aryl halogenides or combinations of halogen and/or hydrogen halide and/or oxidized mineral acids.

DESCRIPTION OF THE PREFERRED EMBOBIMENTS

The method according to the invention can be carried out in different types of reactors, provided that inside the reactor a fluidized state of solids develops. Appropriate reactors are already known. By way of example reactors providing a bubbling or turbulent fluidized bed may be mentioned. The method can be carried out, for example, continuously or discontinuously. A continuous process is preferred. The silicon particles formed by separation can be carried out of the reactor continuously or discontinuously.

Silicic gases to be employed can be silanes, silicon iodides and halosilanes of chlorine, bromine and iodine. Also mixtures of the named compounds can be employed. It is irrelevant whether the silicon compound is already rendered in gaseous form at room temperature or needs to be transformed into gaseous condition first. The transformation to gaseous condition can be carried out thermally for example. The use of silanes is preferred. By way of example $SiH_4$, $Si_2H_6$, $Si_3H_8$, $Si_4H_{10}$ and $Si_6H_{14}$ may be named. Particularly preferred is $SiH_4$.

It is possible to carry out the method according to the invention for the manufacture of highly purified, granular silicon by adding a silicon-free gas or a mixture of several silicon-free gases. For example, the amount of silicon-free gas added can be 0 to 98 volume percent based on the total amount of gas introduced. It is also possible, however, to work without adding any silicon-free gas.

Suitable silicon-free gases are, for example, noble gases, nitrogen and hydrogen, the silicon-free gases being applicable each gas individually or any combination of them. Nitrogen and hydrogen are preferred, particularly preferred is hydrogen.

Temperature can be varied in the temperature range from 300° C. to 1400° C. The temperature must be high enough, however, to ensure the decomposition of the silicic gas and must not exceed the melting temperature of the produced silicon. In case of $SiH_4$ being used the advantageous temperature range is between 500° C. and 1400° C. A decomposition temperature from 600° C. to 1000° C. is preferred, particularly preferred 620° C. to 800° C. In case of $SiI_4$ being used the respective range is between 850° C. and 1250° C., for other halosilanes between 500° C. and 1400° C.

The method according to the invention is carried in a fluidized bed. Solid particles—hereinafter referred to as particles—are provided in the reaction zone of a fluidized-bed reactor. These particles can be introduced from the exterior continuously. These particles can also be particles which are generated in the reaction zone. The particles form a fixed bed through to which the introduced gas is streamed. The stream-in velocity of the introduced gas is adjusted such that the fixed bed is fluidized and a fluidized bed develops. The respective procedure is generally known to the skilled person. The stream-in velocity of the introduced gas must correspond to at least the loosening velocity (also referred to as minimum fluidizing velocity $u_{mf}$). Loosening velocity in this case is to be understood as the velocity at which a gas streams through a bed of particles and below which the fixed bed is maintained, i.e. below which the bed particles remain largely fixed. Above this velocity the bed starts fluidizing, i.e. the bed particles move and bubbles begin to emerge.

Preferably the stream-in velocity of the introduced gas is one to ten times the loosening velocity, particularly preferred one and a half to seven times the loosening velocity. Preferably particles of a diameter of 50 to 5000 µm are used.

The particles used are preferably silicon particles. Preferably such silicon particle have a purity corresponding to the one desired for the produced highly purified, granular silicon. It is also possible, however, to use silicon particles with a certain doping level if doped material is desired. Also particles not consisting of silicon are suitable provided they are stable under the said reaction conditions.

The free-flowing mobile elements used for splitting of bubbles and intensifying the gas/solids contact are preferably elements with a density between 1.0 g.cm$^3$ and 5 g.cm$^{-3}$, particularly preferred 1.1 to 2.6 g.cm$^3$. The density of the free-flowing mobile elements must be at least the density of the emulsion phase.

Preferably the free-flowing mobile elements have an average diameter that is at least one order of magnitude higher than the average diameter of the particles contained in the fluidized bed.

The free-flowing mobile elements can have, for example, a spherical, ellipsoide, cylindrical or diskoid, symmetrical or asymmetrical or an irregular exterior form.

The free-flowing mobile elements can have a massive, porous or hollow interior. When hollow elements are used the density of such free-flowing mobile elements can be adjusted by filling with a solid. In case of a hollow type the elements can be damaged, be filled with bed material and sink, but they are mechanically stabilized by the deposition of silicon on them. The use of hollow or porous free-flowing mobile elements is preferred.

Different materials are suitable for such free-flowing mobile elements. It must be ensured, however, that the elements are stable to the mechanical strain to which they are subjected in the fluidized bed. Suitable materials are, for example, silicon, metallic materials, e.g. special steel, non-metallic materials, ceramic materials or composite materials.

Since the free-flowing mobile elements are soon covered by a silicon layer in the reactor, they obtain quickly an abrasion resistance similar to the one of the silicon formed, therefore also materials such as graphite can be used.

Particularly preferred the elements consist of a material which does not contaminate the silicon. Suitable materials are for example silica glass, graphite, silicon carbide or silicon or ceramic or composite materials.

It showed that free-flowing mobile elements consisting of materials of a sufficient purity and a density above the density of the emulsion phase, i.e. the phase in a fluidized bed with a high concentration of solids, and below the density of the particles provided in the fluidized bed are suitable to reduce the size of the gas bubbles forming in the fluidized bed considerably. This minimizes the reaction zone for the decomposition of silicic gas to silicon dust mainly occurring in the bubble volume. Further the splitting of bubbles results in silicon particles "raining" through the area of high concentration onto the dust formed due to the homogeneous decomposition of gas containing silicon, cementing such dust on the surface of the particles, such process being called "scavenging" in the relevant literature.

It is preferred to remove silicon in a separate procedural step, said silicon being deposited on such free-flowing mobile elements during decomposition of gas containing silicon.

To remove the silicon epitaxially grown in the reaction the free-flowing mobile elements can be collect, for example by segregation, on the bottom of the reactor and then removed. The elements can be regenerated externally then by decomposition of the silicon in a chemical reaction. Suitable reactions are, for example, reactions with hydrohalogens, e.g. HF, HCl, HBr, HI, or halogens, e.g. $F_2$, $Cl_2$, $Br_2$, $I_2$. It is also conceivable to react the silicon with a mixture of halogen and/or hydrohalogen and/or oxidized mineral acid, e.g. $HNO_3$. Another suitable way of decomposing silicon is the reaction with alkyl halogenides, e.g. $CH_3Cl$, or aryl halogenides. Such conversions can be carried out at temperatures between room temperature and 120° C., depending on the reaction type. An inert gas, e.g. nitrogen or a noble gas, or a mixture of several inert gases, can be added to the reaction gas or the reaction mixture.

It is also possible to regenerate the free-flowing mobile elements in situ. To this end, it is possible, for example, to collect the free-flowing mobile elements first by segregation on the bottom of the reactor. Subsequently for example hydrohalogen, halogen, alkyl halogenides, aryl halogenides or mixture of halogen and/or hydrohalogen and/or oxidized mineral acid is introduced in the reactor from below. Preferably the feeding rate is adjusted such that the introduced reactants are reacted completely in the area where the free-flowing mobile elements gathered. This prevents an undesired reaction of the produced silicon granules.

To remove the silicon epitaxially grown on the free-flowing mobile elements in the reaction the fact can be utilized that, as a rule, the silicon deposited on the free-flowing mobile elements has a different thermal expansibility factor than the free-flowing mobile elements. So the elements can be heated or cooled, for example, causing a cracking off of silicon due to different thermal expansibility factors.

Of course it is also possible of course to carry out a combination of the measures specified above to remove the silicon epitaxially grown on the free-flowing mobile elements in the reaction.

A preferred embodiment of the method according to the invention comprises a combination of the two specified procedural steps. In a first step a gas containing silicon is thermally decomposed in a fluidized bed in the presence of free-flowing mobile elements. Silicon deposits on said elements. Once an amount of silicon affecting the function of said elements has deposited on such elements, the elements are regenerated in situ or externally by reacting the formed silicon, e.g. by contact with hydrogen halides, halogens, alkyl halogenides or aryl halogenides, or by thermal treatment.

The silicon produced according to the inventive method is particularly suitable for use in the photovoltaic area and for the manufacture of electronic components.

In the following the method according to the invention is being discussed by means of exemplary operating states and illustrated by examples, without restricting the inventive idea insofar.

All pressure values specified refer to the absolute pressure. The pressure values specified are to be understood as the pressure prevailing behind the fluidized bed as seen in flow direction of the introduced gas mixture, unless otherwise provided.

While specific embodiments of the invention have been shown and described in detail to illustrate the application of the principles of the invention, it will be understood that the invention may be embodied otherwise without departing from such principles.

EXAMPLES

Example 1

Influence of the Presence of Free-Flowing Bubble Breaker Elements on the Pyrolysis of Silane in a Fluidized Bed.

In a fluidized-bed reactor (diameter=52.4 mm, height with head extended=1600 mm), 890 g of silicon particles with an average diameter of 349 $\mu$m were provided. The experiments were carried out at a pressure of 1150 mbar. After start-up and heating of the fluidized bed to a temperature of 680° C. in hydrogen, the silane concentration ($SiH_4$) at the entrance of the reactor was adjusted from 0 to 10 volume percent based on the fluidizing gas hydrogen. The ratio of the gas velocity u of the introduced gas to the minimum fluidizing velocity $u_{mf}$ was $u/u_{mf}=5$.

In an experiment without free-flowing mobile elements 207 standard litres of silane were decomposed under the specified conditions. In a second experiment 41 free-flowing mobile elements consisting of quartz (hollow cylinders, length=8 mm, diameter=6–8 mm, density p=1.1–1.3 $g.cm^{-3}$) were added and 201 standard litres of silane were decomposed. Table 1 specifies a comparison of the reacted material and selectivity to form dust, wherein the values obtained in the experiment in the presence of free-flowing mobile elements consisting of quartz were set 100% and the other values refer to this value. The amount of reacted material is only slightly higher by 0.4 percent, but the dust selectivity achieved is 7.9 percent lower.

TABLE 1

|  | Standardized amount of material reacted, % | Standardized selectivity to dust, % |
| --- | --- | --- |
| with quartz elements | 100 | 100 |
| without additional elements | 99.6 | 107.9 |

The example illustrates clearly the positive influence of free-flowing mobile elements on the reduction of dust selectivity. 0.13 g silicon had deposited on the 41 quartz elements employed. The small amount of deposited silicon is to be attributed to the short experimental period and the small percentage of the surface of the quartz elements in the silicon surface in the bed.

Example 2

Reaction of the Formed Silicon with Hydrogen Chloride.

18 of the free-flowing mobile quartz elements which were covered with a closed silicon layer subsequent to Experiment 1, were separated from the fluidized bed by screening and were introduced in a second reactor (fixed bed) of quartz where they were exposed to a mixture of hydrogen chloride and nitrogen in a mol ratio of 0.33:1, 20 minutes at a temperature of 470° C., and 16 minutes at a temperature of 485° C. After inerting and cooling the quartz elements were discharged from the reactor. A mass difference compared to fresh spheres could not be detected in the applied range of measuring accuracy ($\pm 10^{-5}$ g).

The invention claimed is:

1. A method for producing granular silicon by thermal decomposition of a gas containing silicon in a fluidized bed, wherein the said decomposition occurs in the presence of free-flowing, mobile elements, wherein silicon being deposited on such free-flowing mobile elements during decomposition of gas containing silicon is removed in a separate procedural step by reacting such silicon with at least one of hydrogen halides, halogens, alkyl halogenides, aryl halogenides and oxidizing mineral acids.

2. A method according to claim 1, wherein the fluidized bed consists of silicon particles with a diameter between 50 and 5000 $\mu$m, through which the introduced gas containing silicon streams in a way such that the silicon particles are fluidized and a fluidized bed develops.

3. A method according to claim 1, wherein the gas containing silicon used is a silane.

4. A method according to claim 1, wherein the gas containing silicon used is $SiH_4$ and that the reaction is carried out at temperatures from 500 to 1400° C.

5. A method according to claim 1, wherein the streaming velocity of the introduced gas containing silicon adopts values from 1 to 10 in relation to the loosening velocity.

6. A method according to claim 1, wherein the free-flowing mobile elements have a density between 1.0 g·cm$^{-3}$ and 5.0 g·cm$^{-3}$.

7. A method according to claim 1, wherein the free-flowing mobile elements have a diameter that is at least one order of magnitude higher than the average diameter of the particles contained in the fluidized bed.

8. A method according to claim 1, wherein the free-flowing mobile elements have at least one of a spherical, ellipsoid, cylindrical, diskoid, symmetrical, asymmetrical and irregular exterior form.

9. A method according to claim 1, wherein the free-flowing mobile elements have at least one of a massive, porous and hollow interior.

10. A method according to claim 1, wherein the materials used for the free-flowing mobile elements are at least one of silicon, metallic materials, non metallic materials, ceramic materials and composite materials.

11. A method for granular producing silicon by thermal decomposition of a gas containing silicon in a fluidized bed, wherein the said decomposition occurs in the presence of free-flowing, mobile elements, wherein silicon being deposited on such free-flowing mobile elements during decomposition of gas containing silicon is removed in a separate procedural step by at least one of heating and cooling of such free-flowing mobile elements.

12. A method according to claim 11, wherein the fluidized bed consists of silicon particles with a diameter between 50 and 5000 µm, through which the introduced gas containing silicon streams in a way such that the silicon particles are fluidized and a fluidized bed develops.

13. A method according to claim 11, wherein the gas containing silicon used is a silane.

14. A method according to claim 11, wherein the gas containing silicon used is $SiH_4$ and that the reaction is carried out at temperatures from 500 to 1400° C.

15. A method according to claim 11, wherein the streaming velocity of the introduced gas containing silicon adopts values from 1 to 10 in relation to the loosening velocity.

16. A method according to claim 11, wherein the free-flowing mobile elements have a density between 1.0 g·cm$^{-3}$ and 5.0 g·cm$^{-3}$.

17. A method according to claim 11, wherein the free-flowing mobile elements have a diameter that is at least one order of magnitude higher than the average diameter of the particles contained in the fluidized bed.

18. A method according to claim 11, wherein the free-flowing mobile elements have at least one of a spherical, ellipsoid, cylindrical, diskoid, symmetrical, asymmetrical and irregular exterior form.

19. A method according to claim 11, wherein the free-flowing mobile elements have at least one of a massive, porous and hollow interior.

20. A method according to claim 11, wherein the materials used for the free-flowing mobile elements are at least one of silicon, metallic materials, non metallic materials, ceramic materials and composite materials.

21. A method for producing one of photovoltaic and electronic components, the method comprising the steps of:

producing granular silicon by thermal decomposition of a gas containing silicon in a fluidized bed, with the decomposition taking place in the presence of free flowing mobile elements;

removing silicon deposited on the free-flowing mobile elements during decomposition of the gas containing silicon by at least one of heating the free-flowing mobile elements, cooling the free-flowing mobile elements, and reacting the silicon with at least one of hydrogen halides, halogens, alkyl halogenides, aryl halogenides and oxidizing mineral acids;

manufacturing the one of photovoltaic and electronic components from the produced silicon.

* * * * *